United States Patent
Tomiyori et al.

[11] Patent Number: 5,459,786
[45] Date of Patent: Oct. 17, 1995

[54] LOUDSPEAKER TELEPHONE DEVICE COMPRISING A NOVEL NOISE SUPPRESSING CIRCUIT

[75] Inventors: Yutaka Tomiyori, Tokyo; Tadashi Eguchi, Saitama, both of Japan

[73] Assignee: NEC Corporation, Tokyo, Japan

[21] Appl. No.: 347,106

[22] Filed: Nov. 22, 1994

Related U.S. Application Data

[63] Continuation of Ser. No. 836,917, Feb. 19, 1992, abandoned.

[30] Foreign Application Priority Data

Feb. 19, 1991 [JP] Japan ..................................... 3-045463

[51] Int. Cl.⁶ .................................................... H04M 1/60
[52] U.S. Cl. .......................... 379/390; 379/388; 379/420; 455/222
[58] Field of Search ...................... 379/387, 388, 379/389, 390, 420, 416; 455/79, 78, 83, 84, 222, 223

[56] References Cited

U.S. PATENT DOCUMENTS

| | | | |
|---|---|---|---|
| 4,317,959 | 3/1982 | Kuriki | 179/1 VC |
| 4,715,063 | 12/1987 | Haddad et al. | 379/388 X |
| 4,847,897 | 7/1989 | Means | 379/390 |
| 4,891,837 | 1/1990 | Walker et al. | 379/390 |
| 4,908,855 | 3/1990 | Ohga et al. | 379/387 |

FOREIGN PATENT DOCUMENTS

| | | |
|---|---|---|
| 0299507 | 1/1989 | European Pat. Off. |
| 87/01546 | 3/1987 | WIPO |

OTHER PUBLICATIONS

Patent Abstracts of Japan, vol. 013, No. 539 (E-853) 30 Nov. 1989.

Primary Examiner—James L. Dwyer
Assistant Examiner—Magdy W. Shehata
Attorney, Agent, or Firm—Foley & Lardner

[57] ABSTRACT

Controlled by a signal level produced by a microphone (12), a noise suppressing circuit (25) supplies a first attenuator (16) with a local level which is equal to the signal level and is suppressed to a predetermined output level when the signal level is lower and higher than a predetermined input level. Cooperating with a drive level produced by a second attenuator (17) to drive a loudspeaker (13), the local level makes a comparator unit (21–23) produce a control signal for making the first attenuator give smaller and greater amounts of attenuation to the signal level with the drive level rendered by the second attenuator low and high when positive and negative values are had, respectively, by an input difference equal to the local level less the drive level. Preferably, the local level is suppressed by a level difference had by the signal level above the predetermined input level.

5 Claims, 5 Drawing Sheets

LOUDSPEAKER TELEPHONE DEVICE COMPRISING A NOVEL NOISE SUPPRESSING CIRCUIT

This application is a continuation of application Ser. No. 07/836,917, filed Feb. 19, 1992 now abandoned.

BACKGROUND OF THE INVENTION:

This invention relates to a loudspeaker telephone device or set and to a noise suppressing circuit which is for use typically in the loudspeaker telephone device.

Usually, a telephone set includes a handset comprising a transmitter and a receiver. A microphone is generally used as the transmitter. When the telephone set is used in a mobile telephone substation installed in an automobile or a like vehicle, where it is highly desired for a user to talk to and to receive a talk signal from a person at a counterpart telephone substation of a plurality of remote telephone substations without holding the handset, a loudspeaker is preferably used instead of the receiver housed in the handset. Such a telephone set is herein called a loudspeaker telephone device.

A loudspeaker telephone device of a local telephone substation converts a microphone output signal to a talk transmission signal, which is transmitted to a counterpart telephone substation typically as a radio transmission signal. When received as a radio reception signal from the counterpart telephone substation, a talk reception signal is converted by the loudspeaker telephone device to a loudspeaker drive signal for use in driving the loudspeaker.

It goes without saying that a mobile telephone substation is for transmitting a user's talk to a counterpart telephone substation and for receiving signal a talk sent from the counterpart telephone substation in order to listen. On transmitting the user's talk to the counterpart telephone substation, the loudspeaker telephone device should be put in a talk transmission mode of operation of giving a small amount of attenuation to the microphone output signal and of giving a great attenuation to the talk reception signal which is quiescent in practice. On receiving a talk signal from the counterpart telephone substation, the loudspeaker telephone device should be put in a talk reception mode of operation of giving a small amount of attenuation to the talk reception signal and a great amount of attenuation to the microphone output signal which may have an appreciably high level due to noise surrounding the loudspeaker telephone device.

In the manner which will later be described more in detail, a conventional loudspeaker telephone device comprises a comparator unit for comparing the microphone output signal having a microphone signal level with the loudspeaker drive signal having a loudspeaker drive level. The comparator unit thereby produces an attenuation control signal with an attenuation control level which is inversely proportional to the microphone signal level less the drive level, namely, inversely proportional to a level difference between the microphone signal level and the drive level. In the manner described in the following, the attenuation control signal is used in putting the loudspeaker telephone device automatically selectively in the talk transmission and reception modes.

In the loudspeaker telephone device, a first attenuator unit is supplied with the microphone output signal and controlled by the attenuation control signal to produce the talk transmission signal by giving the microphone output signal a first variable amount of attenuation which increases with an increase in the attenuation control level. A second attenuator unit is supplied with the talk reception signal and controlled by the attenuation control signal to produce the loudspeaker drive signal by giving the talk reception signal a second variable amount of attenuation which decreases with the above-mentioned increase.

The microphone of the mobile telephone substation is often surrounded by a strong or loud noise. In such an event, the microphone produces the microphone output signal with a considerably high microphone signal level even when the user does not speak to the microphone in the meantime. As a consequence, the microphone signal level becomes appreciably higher than the drive level even if the talk reception signal is delivered to the second attenuator unit with a significant level. Under the circumstances, the conventional loudspeaker telephone device is undesiredly kept in the talk transmission mode of attenuating the talk reception signal. This makes the loudspeaker drive signal have an objectionably low drive level and renders it impossible for the loudspeaker to clearly reproduce the talk sent from the counterpart telephone substation.

SUMMARY OF THE INVENTION

It is therefore a principal object of the present invention to provide a loudspeaker telephone device which can be automatically switched from a talk transmission mode to a talk reception mode when a talk reception signal is received with a significant level even in the presence of a strong surrounding noise.

It is a subordinate object of this invention to provide a loudspeaker telephone device which is of the type described and with which a user can speak to at person at a counterpart telephone substation in the presence of a surrounding noise of a high noise level if the user speaks with a level which is higher than the noise level.

It is a different object of this invention to provide a noise suppressing circuit which is for use primarily in a loudspeaker telephone device of the type described.

Other objects of this invention will become clear as the description proceeds.

On setting forth the gist of an aspect of this invention, it is possible to understand that a loudspeaker telephone device is for converting a microphone output signal having a microphone signal level to a talk transmission signal and for converting a talk reception signal to a loudspeaker drive signal having a drive level and includes: (a) a comparator unit for comparing a local signal having a local level derived from the microphone signal level and the loudspeaker drive signal to produce an attenuation control signal with an attenuation control level inversely proportional to a level difference equal to the local level less the drive level, (b) a first attenuator controlled by the attenuation control signal to produce the talk transmission signal by giving the local signal a first variable amount of attenuation increasing with an increase in the attenuation control level, and (c) a second attenuator controlled by the attenuation control signal to produce the loudspeaker drive signal by giving the talk reception signal a second variable amount of attenuation decreasing with the above-mentioned increase.

According to the above-mentioned aspect of this invention, the above-understood loudspeaker telephone device comprises a noise suppressing circuit supplied with the microphone output signal to produce the local signal with the local level varied in accordance with the microphone signal level when the microphone signal level is lower than a predetermined input level and with the local level suppressed to a predetermined output level when the microphone signal level is higher than the predetermined input level.

On setting forth a different aspect of this invention, it is possible to understand that a noise suppressing circuit is supplied with a circuit input signal having a signal input level for producing a circuit output signal having a signal output level.

According to the different aspect of this invention, the above-understood noise suppressing circuit comprises: (A) a gain control unit controlled by a gain control signal having a gain control level to produce the circuit output signal by giving the circuit input signal a controllable amount of attenuation in accordance with the gain control level: (B) a rectifier unit for rectifying the circuit input signal to produce a rectified signal having a rectified voltage proportional to the signal input level: (C) a voltage-to-current converter unit supplied with the rectified signal to produce an output current signal having a current value proportional to a voltage difference which the rectified voltage has above a predetermined voltage: and (D) supply means for supplying the output current signal to the gain control unit to use the current value as the gain control level whereby the signal output level is rendered proportional to the signal input level when the signal input level is lower than a predetermined input level determined by the predetermined voltage, the signal output level being suppressed to a predetermined output level when the signal input level is higher than the predetermined input level.

DESCRIPTION OF THE PREFERRED EMBODIMENT

Figure 1:
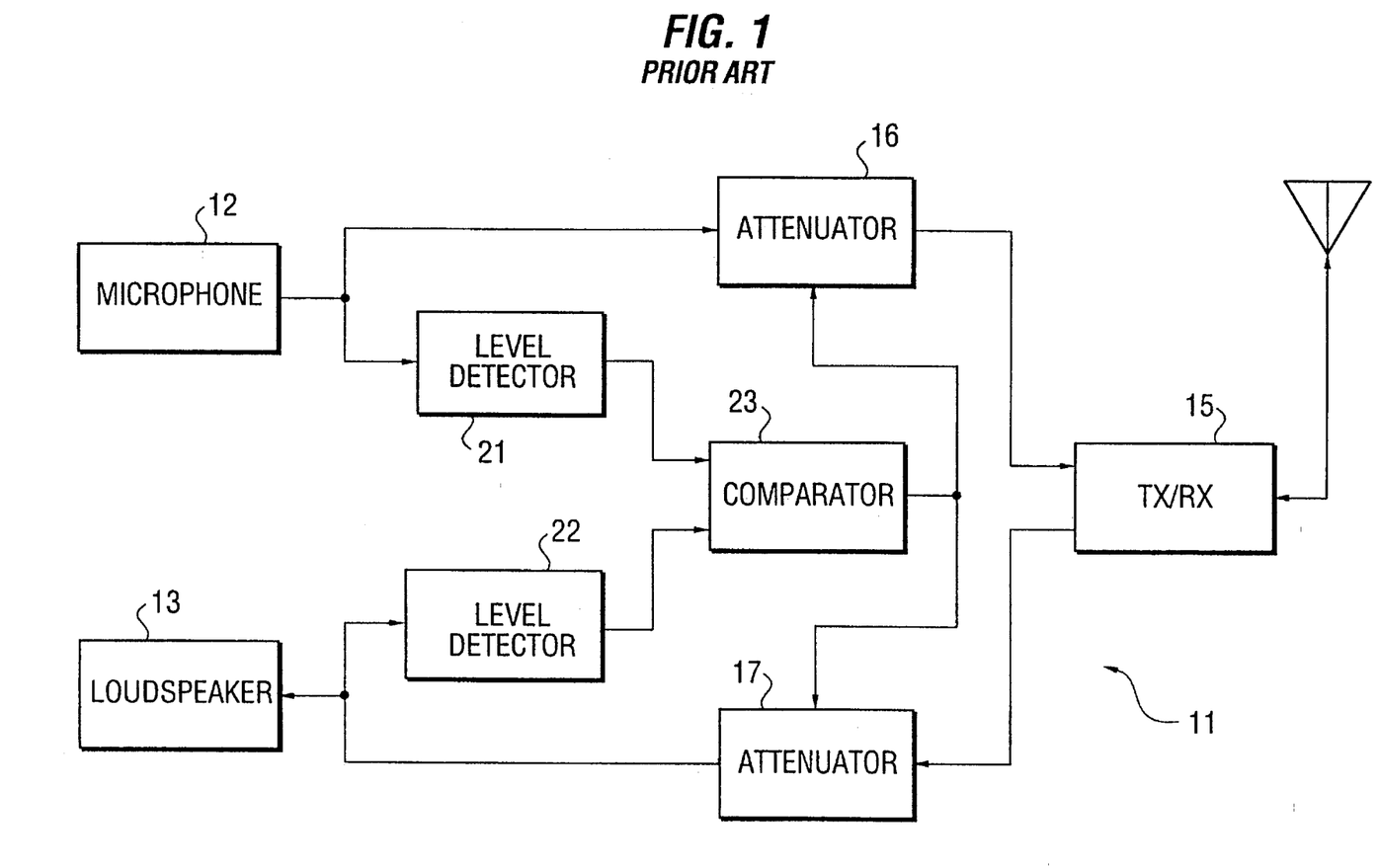
FIG. 1 is a block diagram of a telephone substation including a conventional loudspeaker telephone device.

Referring to FIG. 1, attention will first be directed, in order to facilitate an understanding of the present invention, to a telephone substation which is used as a local telephone substation and includes a conventional loudspeaker telephone device or set 11. It is known in the art that the loudspeaker telephone device 11 includes a microphone 12 as a transmitter and is featured by a loudspeaker 13 which is used in place of a usual receiver housed in a handset (not shown) together with the transmitter.

The microphone 12 produces a microphone output signal either, ordinarily, when a user of the local telephone substation speaks into the microphone 12 for transmission of a user's speech to a person at a counterpart telephone substation of a plurality of remote telephone substations (not shown) by, for example, a radio transmission signal produced by a radio transmitter/receiver (TX/RX) 15 in response to the microphone output signal in the manner which will presently become clear or, depending on the circumstances, when the microphone 12 picks up a surrounding noise of a noise level even in the absence of the user's voice. Even if produced in response to the surrounding noise, the microphone output signal is undesirably transmitted to the counterpart telephone substation.

When produced in response to the user's talk in the absence of the surrounding noise, the microphone output signal has a microphone signal level which depends solely on a voice level of human voice uttered as the user's talk. When the microphone output signal is produced in response to the surrounding noise while the user is quiescent, the microphone signal level depends on the noise level.

When a radio reception signal is received with a signal reception level from the counterpart telephone substation, the radio transmitter/receiver 15 produces a talk reception signal with a signal production level. In this manner, the radio transmitter/receiver 15 serves in the telephone substation being illustrated as a radio device which includes various other circuit elements which are known in the art and are not shown.

In the manner which will shortly become clear, the loudspeaker telephone device 11 is for converting the microphone output signal to a talk transmission signal for transmission as the radio transmission signal to the counterpart telephone substation. The loudspeaker telephone device 11 is furthermore for converting the talk reception signal to a loudspeaker drive signal for use in driving the loudspeaker 13. The loudspeaker drive signal has a loudspeaker drive level which depends on the signal production level at which the talk reception signal is produced by the radio transmitter/receiver 15.

In general, the talk transmission signal is transmitted to the counterpart telephone substation by putting the loudspeaker telephone device 11 in a talk transmission mode of operation of giving a small amount of attenuation to the microphone output signal and of giving a great amount of attenuation to the talk reception signal. On producing the loudspeaker drive signal, the talk transmission mode should automatically be switched to a talk reception mode of operation of giving a small amount of attenuation to the talk reception signal and of giving a great amount of attenuation to the microphone output signal.

For this purpose, first and second attenuator units or attenuators 16 and 17 are used together with first and second level detectors 21 and 22 which are connected to a comparator 23 for supplying the first and the second attenuators 16 and 17 with an attenuation control signal with an attenuation control level in the manner which will presently be described, Supplied with the talk reception signal and controlled by the attenuation control signal, the second attenuator 17 produces the loudspeaker drive signal with the loudspeaker drive level determined by the attenuation control level. The loudspeaker drive signal is delivered to the loudspeaker 13 and to the second level detector 22, which detects the loudspeaker drive level for supply to the comparator 23 as one of two comparison input signals that has the drive level.

In the conventional loudspeaker telephone device 11, the microphone output signal is supplied directly to the first attenuator 16 and to the first level detector 21. Controlled by the attenuation control signal, the first attenuator 16 produces the talk transmission signal with the microphone signal level attenuated depending on the attenuation control level. The first level detector 21 detects the microphone signal level for supply to the comparator 23 as the other of the two comparison signals that has the microphone signal level.

Figure 2:
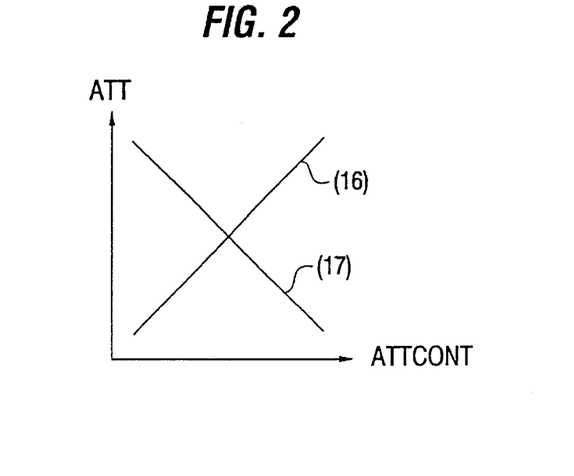
FIG. 2 exemplifies attenuation characteristics which are used in a loudspeaker telephone device in general.

Turning to FIG. 2 during a short while, the first and the second attenuators 16 and 17 (FIG. 1) have attenuation characteristics exemplified by straight lines which are labelled (16) and (17) and each of which shows an amount of attenuation (ATT) versus the attenuation control level indicated at (ATTCONT). More particularly, the amount of attenuation increases in the first attenuator 16 with an increase in the attenuation control level. The amount of attenuation decreases in the second attenuator 17 with the above-mentioned increase.

Turning back to FIG. 1, a combination of the first and the second level detectors 21 and 22 and the comparator 23 serves as a comparator unit. In the conventional loudspeaker telephone device 11, the comparator unit (21–23) is supplied with the microphone output signal and the loudspeaker drive signal and compares the microphone signal level and the loudspeaker drive level with each other to render the attenuation control level dependent on an input level difference which is obtained by subtracting the drive level from the microphone signal level. When the level difference is equal to zero, a predetermined level is given to the attenuation control level. When the level difference has a positive value, the attenuation control level becomes lower than the predetermined level. When the level difference is negative, the attenuation control level becomes higher than the predetermined level.

It is now understood in connection with the conventional loudspeaker telephone device 11 that the microphone output signal is given a small amount of attenuation with the talk reception signal given a great amount of attenuation when the microphone signal level is higher than the loudspeaker drive level. The talk reception signal is given a small amount of attenuation with the microphone output signal given a great amount of attenuation when the drive level is higher than the microphone signal level. In this manner, the conventional loudspeaker telephone device 11 is selectively put in the talk transmission and reception modes.

It will now be presumed merely for convenience of the description which follows that the local telephone substation is a mobile telephone substation installed in an automobile or a like vehicle. The microphone 12 may be subjected to a surrounding noise lasting during an appreciable interval of time and having a strong or high noise level which may vary or fluctuate during the time interval.

The conventional loudspeaker telephone device 11 is undesirably kept in the talk transmission mode under such a strong or loud surrounding noise. This is because the microphone signal level is considerably higher than the loudspeaker drive level even when the user is quiescent in the meantime and even if the talk reception signal is produced with a significant signal production level. It is therefore impossible under the circumstances to automatically switch the talk transmission mode to the talk reception mode. Inasmuch as the talk reception signal is unduly attenuated in the talk transmission mode, the loudspeaker drive signal has an objectionably low drive level. The loudspeaker can not produce a clear reproduction of a talk sent from the counterpart telephone substation.

Figure 3:
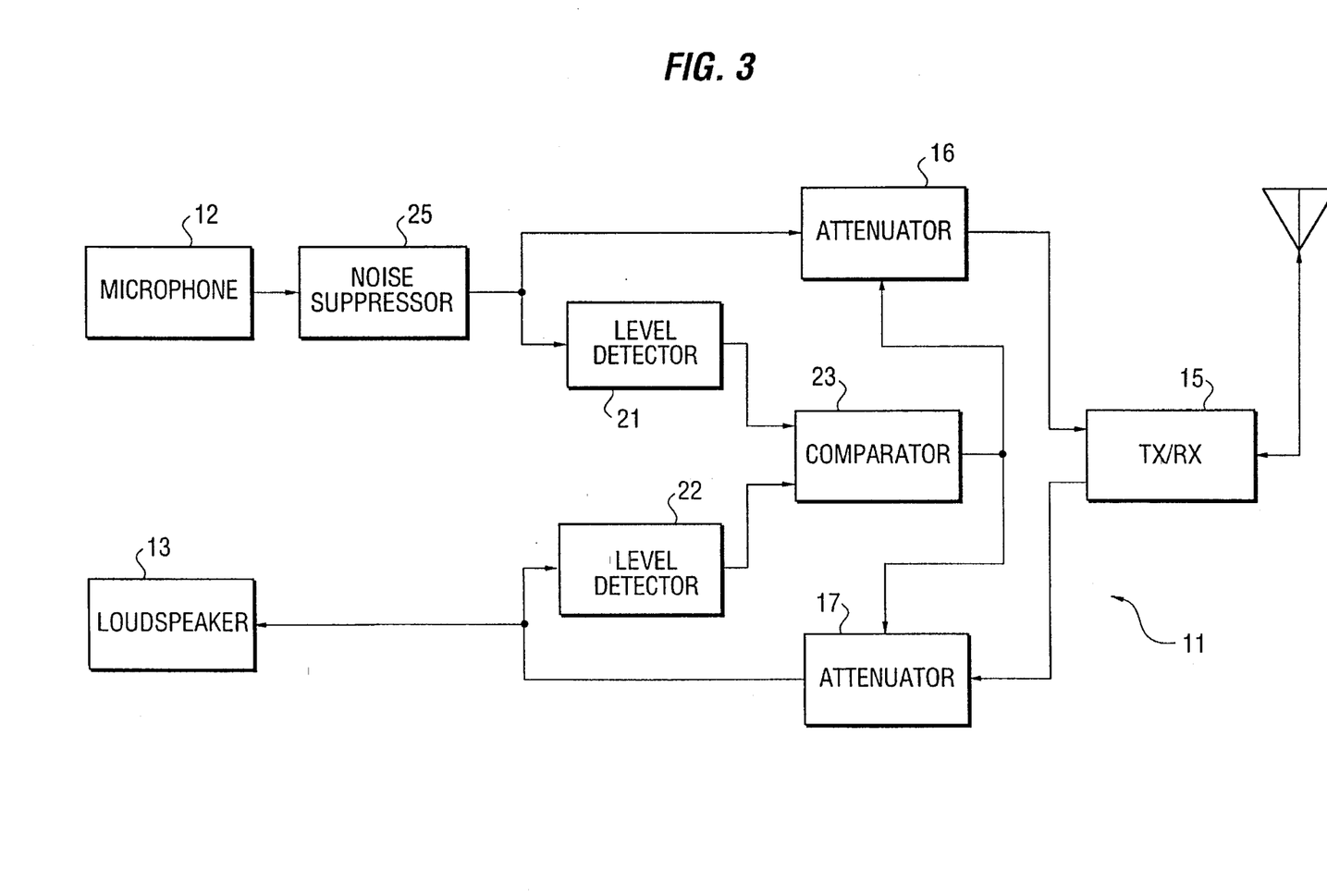
FIG. 3 is a block diagram of a telephone substation which includes a loudspeaker telephone device according to an embodiment of the instant invention.

Referring now to FIG. 3 with FIG. 2 additionally referred to, the description will be directed to a local telephone substation comprising similar parts which are designated by like reference numerals and are similarly operable with likewise named signals unless otherwise pointed out hereinafter. In FIG. 3, the telephone substation includes a loudspeaker telephone device which is according to a preferred embodiment of the present invention and will be designated by the reference numeral 11 as before merely for convenience of designation.

The microphone output signal is now delivered to the first attenuator 16 and to the comparator unit (21–23) indirectly as a local signal through a noise suppressing circuit 25 which will become clear as the description proceeds. The local signal is produced by the noise suppressing circuit 25 with a local level into which the microphone signal level is varied or adjusted in accordance with the microphone signal level. In other words, the local level is derived from the microphone signal level.

More specifically, the microphone signal level is varied to render the local level substantially equal to the microphone signal level when the microphone signal level is lower than a predetermined input level. The microphone signal level is suppressed to a predetermined output level for use as the local level when the microphone signal level is higher than the predetermined input level. The predetermined input level may be equal to the microphone signal level derived when the voice level is equal to an ordinary level of the user's talk. The predetermined output level may be equal to the local level produced by the noise suppressing circuit 25 in response to the microphone output signal having the microphone signal level which is substantially equal to the predetermined input level.

Supplied with the local signal instead of the microphone output signal and with the loudspeaker drive signal, the comparator unit (21–23) renders the attenuation control level dependent on an improved level difference which is obtained by subtracting the loudspeaker drive level from the local level. In other respects, the comparator unit is operable in the manner from that described in conjunction with FIG. 1. It may be mentioned here that the attenuation control level will presently be described with reference to one of the drawing figures and that a like level difference can be used by subtracting the local level from the loudspeaker drive level.

The first and the second attenuators 16 and 17 are controlled by the attenuation control level which is determined by the improved level difference. It should consequently be understood in connection with FIG. 2 that the attenuation control level depends on the improved level difference.

Figure 4:
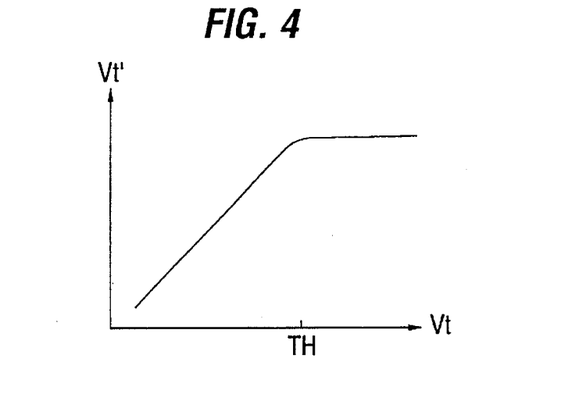
FIG. 4, depicted below FIG. 2 merely for convenience of illustration, exemplifies an input-to-output characteristic of a noise suppressing circuit which is used in the loudspeaker telephone device shown in FIG. 3.

Turning temporarily to FIG. 4, the microphone signal level is represented by Vt with the local level represented by Vt'. The local level is detected by the first level detector 21. Under the circumstances, the noise suppressing circuit 25 (FIG. 3) has an input-to-output characteristic exemplified in connection with the microphone signal level and the local level in the figure being referenced.

In the manner exemplified in FIG. 4, the local level is substantially equal to the microphone signal level when the microphone signal level is lower than the predetermined input level which is now represented by TH. The local level is kept at or suppressed to the predetermined output level when the microphone signal level is higher than the predetermined input level.

Figure 5:
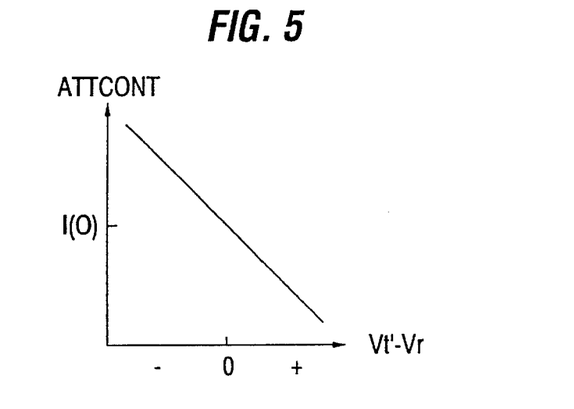
FIG. 5 exemplifies an input-to-output characteristic of a comparator unit which is used in the loudspeaker telephone device illustrated in FIG. 3

Further turning to FIG. 5, the attenuation control level is denoted by (ATTCONT) as before. It is possible to understand that the comparator 23 (FIG. 3) is supplied with a collective input signal having an input difference level (Vt'–Vr), where Vr represents the loudspeaker drive level detected by the second level detector 22. The comparator 23 therefore has an input-to-output characteristic exemplified as regards the attenuation control level versus the input difference level in the drawing figure being referred to.

As exemplified in FIG. 5, the attenuation control level is equal to a predetermined level or current value I(0) when the input difference level is equal to zero. When the talk is not received from the counterpart telephone substation so that the input difference level has a positive value, the attenuation control level is rendered lower than the predetermined level. When the talk reception signal is produced with the significant signal production level to make the input difference level have a negative value even in the presence of a strong surrounding noise which is suppressed by the noise suppressing circuit 25 (FIG. 3), the attenuation control level is given a higher level than the predetermined level.

Turning back to FIG. 3, the noise suppressing circuit 25 is for producing the local signal by giving a controllable amount of attenuation to the microphone output signal. The controllable amount of attenuation is substantially equal to zero when the microphone signal level is lower than the predetermined input level. When the microphone signal level is higher than the predetermined input level, the controllable amount increases in proportion to a level increment which is had by the local level above the predetermined input level. The local level consequently varies in the manner exemplified in FIG. 4.

The illustrated loudspeaker telephone device 11 therefore produces the talk transmission signal with the local signal given by the first attenuator 16 a first variable amount of attenuation determined by the attenuation control level. The loudspeaker drive signal is produced with the talk reception signal given by the second attenuator 17 a second variable amount of attenuation dependent on the attenuation control level. When the microphone signal level is lower than the predetermined input level, the first and the second variable amounts of attenuation are not much different from those used in the conventional loudspeaker telephone device 11 illustrated with reference to FIG. 1. When the microphone signal level is higher than the predetermined input level as a result of presence of a strong surrounding noise, each of the first and the second variable amounts is markedly different from a corresponding one of the small amounts or the great amounts of attenuation described in conjunction with FIG. 1. This will become clear from the following.

It will first be surmised that the microphone 12 is not subjected to a surrounding noise having an appreciable noise level. It will be assumed in addition that the user begins speaking to the microphone 12 with a voice level which is not higher than an ordinary level of the user's talk. Under the circumstances, the microphone output signal is supplied to the first attenuator 16 through the noise suppressing circuit 25 with the local level into which the microphone signal level is varied with substantially no attenuation. When the talk reception signal is produced with a substantially zero signal production level under the situations, the input difference level (Vt'–Vr) is high. As a consequence, the first variable amount of attenuation is small. The second variable amount of attenuation is great. The illustrated loudspeaker telephone device 11 is therefore, put in the talk transmission mode.

It will be assumed in addition that the user suspends speaking to the microphone 12. It will be supposed that the talk reception signal is produced with a significant signal production level under the situations. The input difference level is given a negative value. The attenuation control level is given a high level. As a result, the first variable amount of attenuation becomes great. The second amount of attenuation becomes small. The loudspeaker telephone device 11 is therefore successfully automatically switched from the talk transmission mode to the talk reception mode.

It will next be surmised that the microphone 12 is subjected to a surrounding noise having a considerably high noise level. It will additionally be assumed that the user speaks to the microphone 12 during absence of the talk reception signal produced with the significant signal production level. It is general under such a strong surrounding noise that the user speaks to the microphone 12 with a high voice level which is higher than the considerably high noise level.

Figure 6:
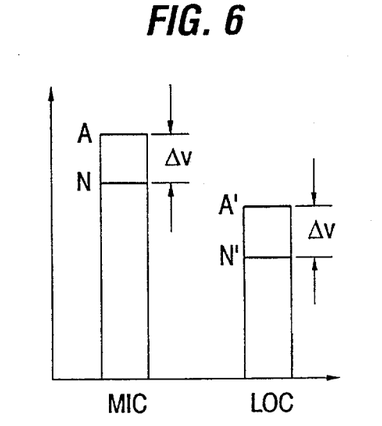
FIG. 6 exemplifies an operation characteristic of the noise suppressing circuit mentioned in connection with FIG. 4

Turning to FIG. 6 during a short while, the considerably high noise level is indicated at N. The high voice level is depicted at A. This is shown on the left in FIG. 6 with a label MIC attached to represent microphone input levels. The microphone output signal consists of a voice output component and a noise output component having component output levels which are determined by the high voice level and the considerably high noise level and each of which is higher than the predetermined input level. It will be supposed merely for brevity of the description that the component output levels are equal to levels A and N and have a level difference Δv.

In the manner exemplified in FIG. 6, shown on the right with label LOC used to indicate the local level, the local signal consists of a local voice component and a local noise component which have a local voice level A' and a local noise level N'. The local voice level is equal to the predetermined output level. Inasmuch as each of the component output levels of the voice and the noise output components is higher than the predetermined input level, the noise suppressing circuit 25 (FIG. 3) gives a common amount of attenuation to the voice and the noise output components supplied thereto. As a result, the level difference is unexpectedly maintained between the local voice level and the local noise level. The local voice and noise components are therefore produced with an output ratio which is hardly deteriorated when compared with an input ratio of the high voice level to the considerably high noise level.

Turning back to FIG. 3, it will now additionally be assumed that the talk reception signal is produced with a significant signal production level during absence of the user's talk. Even though the surrounding noise has the considerably high noise level, the local level does not become higher than the predetermined output level. It is consequently possible to make the input difference level (Vt'–Vr) have a negative value. The attenuation control level is rendered higher than the predetermined level. As a result, the first variable amount of attenuation is given a great value. The second variable amount of attenuation is rendered small. The illustrated loudspeaker telephone device 11 is astonishingly automatically switched from the talk transmission mode to the talk reception mode. Inasmuch as the second amount of attenuation is small, the talk reception signal gives the loudspeaker drive signal a high drive level. This makes the loudspeaker 13 produce a clear reproduction of the talk received as the talk reception signal.

Figure 7:
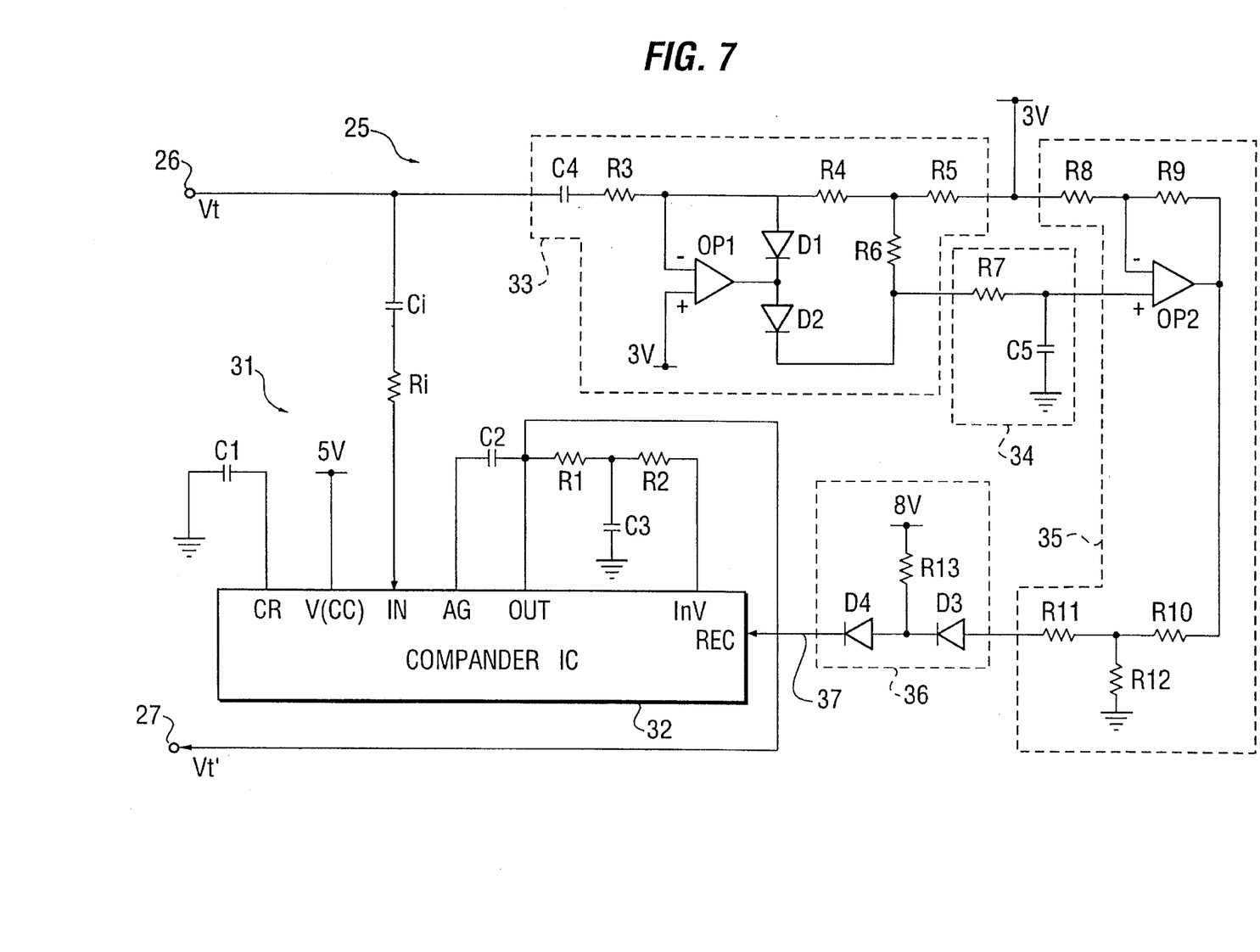
FIG. 7 is a practical circuit diagram of the noise suppressing circuit mentioned in conjunction with FIG. 4.

Referring now to FIG. 7, the noise suppressing circuit 25 has circuit input and output terminals 26 and 27. When the noise suppressing circuit 25 is used in the loudspeaker telephone device 11 illustrated with reference to FIG. 3, the circuit input terminal 26 is supplied with the microphone output signal having the microphone signal level Vt. The noise suppressing circuit 25 delivers the local signal to the circuit output terminal 27 with the local level Vt'.

When attention is directed to the noise suppressing circuit 25 alone, it will be said that the circuit input terminal 26 is supplied with a circuit input signal. In other words, the microphone output signal is referred to as the circuit input signal. The microphone signal level Vt will be called a signal input level. The local signal will be referred to as a circuit output signal. The local level Vt' will be called a signal output level.

Under the circumstances, the noise suppressing circuit 25 is for rendering the signal output level substantially equal to the signal input level when the signal input level is lower than a predetermined input level. When the signal input level is higher than the predetermined input level, the signal output level is suppressed to a predetermined output level.

Preferably, the noise suppressing circuit 25 comprises a gain control unit 31. It is convenient to use a compander integrated circuit (compander IC) 32 in the gain control unit 31. In this event, a peripheral control circuit should be connected to the compander integrated circuit 32 in the manner which will presently be described in connection with a practical example of the noise suppressing circuit 25. The compander integrated circuit 32 is preferably μPD796 manufactured and sold by NEC Corporation, Tôkyô, Japan. Alternatively, the compander integrated circuit 32 may be NE575 manufactured and sold by Cygnetics.

The compander integrated circuit 32 has a plurality of pins which will become clear as the description proceeds. As a part of the peripheral control circuit, an input circuit is connected to a signal input pin IN. In the example being illustrated, the input circuit comprises an input capacitor Ci connected to the circuit input terminal 26 and an input resistor Ri between the input capacitor and the signal input pin.

A circuit power source of plus 5 V is connected to a power supply pin V(CC). A circuit output pin OUT is connected to the circuit output terminal 27. A gain control input pin REC is supplied with a gain control signal which will shortly be described.

As a fractional part of the peripheral control circuit, a first capacitor C1 is connected between one of connection pins CR and ground. A major part of the peripheral control circuit comprises a second capacitor C2 between the circuit output pin and another of the connection pins AG, a series circuit of first and second resistors R1 and R2 between the circuit output pin and still another of the connection pins InV, and a third capacitor C3 between a point of connection between the first and the second resistors and ground.

As well as to the input capacitor Ci, the circuit input terminal 26 is connected to a rectifier detector unit 33. In the practical example, the detector unit 33 comprises a fourth capacitor C4 connected to the circuit input terminal 26, a third resistor R3 connected to the fourth capacitor, a first operational amplifier OP1 having a first amplifier output terminal, an inverted input terminal connected to the third resistor, and a non-inverted input terminal supplied with plus 3 V from a local power source, a series connection of first and second diodes D1 and D2 connected to the third resistor and having a point of connection connected to the first amplifier output terminal, a series circuit of fourth and fifth resistors R4 and R5 between the third resistor and a unit power source of plus 3 V, and a sixth resistor R6 between a cathode electrode of the second diode and a point of connection between the fourth and the fifth resistors.

In the example being illustrated, the first operational amplifier serves as a differential amplifier which is accompanied by a feedback resistor comprising the fourth and the fifth resistors and has a gain determined by a resistance ratio between the fifth and the sixth resistors. The third resistor serves as an input resistor. Comprising the first and the second diodes, the detector unit 33 serves as a half-wave detector.

A smoothing unit 34 is connected to the rectifier detector unit 33. In the manner known in the art, the smoothing unit 34 may comprise a seventh resistor R7 connected to a point of connection between the sixth resistor and the cathode electrode of the second diode. A fifth capacitor C5 is connected between the seventh resistor and ground.

A combination of the rectifier detector unit 33 and the smoothing unit 34 serves as a rectifier unit for rectifying the circuit input signal into a rectified signal. Through the smoothing unit 34, the rectifier unit (33, 34) produces the rectified signal with a rectified voltage which is proportional to the signal input level.

A voltage follower unit 35 is connected to the rectifier unit (33, 34) and is supplied with plus 3 V from the unit power source. In the practical example, the voltage follower unit 35 comprises a voltage follower which comprises an eighth resistor R8 connected to the unit power source, a second operational amplifier OP2 having a second amplifier output terminal, an inverted input terminal connected to the eighth resistor, and a non-inverted input terminal connected to the smoothing unit 34, and a ninth resistor R9 between the amplifier output terminal and the inverted input terminal of the second operational amplifier. A voltage divider is connected to the voltage follower and comprises a series circuit of tenth and eleventh resistors R10 and R11 connected to a point of connection between the second amplifier output terminal and the ninth resistor and a twelfth resistor R12 between a point of connection between the tenth and the eleventh resistors and ground.

A current modifier unit 36 is connected to the voltage follower unit 35. In the practical example, the current modifier unit 36 comprises a series connection of third and fourth diodes D3 and D4 connected to the voltage follower unit 35 and having a point of connection supplied with plus 8 V from a local power source through a thirteenth resistor R13.

A combination of the voltage follower unit 35 and the current modifier unit 36 serves as a voltage-to-current converter unit. Supplied with the rectified signal, the voltage-to-current converter unit (35, 36) produces an output current signal having a current value I(c) proportional to a voltage increment which the rectified voltage has above or relative to a predetermined voltage.

More particularly, the current value is kept substantially at zero until the rectified voltage rises up to the predetermined voltage. When the rectified voltage rises above the predetermined voltage, the current value increases in proportion to the voltage increment.

The output current signal is supplied to the gain control input terminal REC of the compander integrated circuit 32 as the gain control signal. A connection 37 is used between the voltage-to-current converter unit (35, 36) and the gain control unit 31 to serve as a supply arrangement. Through the supply arrangement (37), the current value makes the gain control unit 31 subject the circuit input signal of the signal input level to a controllable amount of attenuation to produce the circuit output signal with the signal output level.

In the practical example, the compander integrated circuit 32 is operable as a compressor, an expander, or a compander when different circuit structures are given to the peripheral control circuit and/or when different circuit constants are given to circuit elements of the peripheral control circuit. In the example being illustrated, the peripheral control circuit is given a circuit structure described above. The following circuit constants are selected.

In the peripheral control circuit: Ci:1.0 microfarad: 82 kiloohms and each of R1 and R2:10 kiloohms. Incidentally, other circuit constants are as follows. C4:0.01 microfarad: C5:10 microfarads: each of R3 and R4: 47 kiloohms R5:4.7 kiloohms; R6:10 kiloohms; R7:330 kiloohms; each of R8 and R9:220 kiloohms; R10:560 ohms: R11:560 kiloohms: R12:5.6 kiloohms; and R13: 1 megohm.

Figure 8:
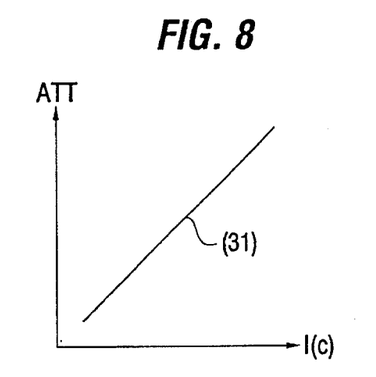
FIG. 8, drawn below FIG. 6, exemplifies an attenuation characteristic of a gain control unit for use in the noise suppressing circuit depicted in FIG. 7.

Turning to FIG. 8 during a short while, the gain control unit 31 (FIG. 7) subjects the circuit input signal to a controllable amount of attenuation which is indicated at (ATT) and increases in the manner exemplified by a straight line labelled (31) when the current value I(c) is not kept substantially at zero but increases. As described above, the current value is substantially equal to zero until the rectified voltage rises up to the predetermined voltage, The current value is therefore kept substantially at zero when the signal input level is lower than a predetermined input level which is determined by the predetermined voltage.

The controllable amount of attenuation is consequently kept substantially at zero until the signal input level rises up to the predetermined input level. When the signal input level rises above the predetermined input level, the controllable amount of attenuation is proportional to a level increment which the signal input level has above or relative to the predetermined input level.

Figure 9:
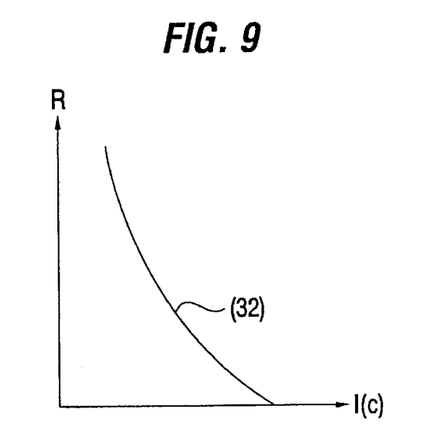
FIG. 9 exemplifies an output-to-input ratio versus a gain control current value in connection with a compander integrated circuit which is used in the gain control unit mentioned in connection with FIG. 8.

Further turning to FIG. 9, the compander integrated circuit 32 (FIG. 7) receives an arriving signal at its circuit input pin IN with an arriving signal level Vt". Attention will be directed to a level ratio R of the signal output level to the arriving signal level. When the circuit elements of the peripheral control circuit are connected in the manner described in conjunction with FIG. 7 and are given the circuit constants described above, the ratio R decreases with an increase in the current value I(c) in the manner which is exemplified by a curve labelled ( 32 ).

Turning back to FIG. 7, it is now clear that the noise suppressing circuit 25 is supplied with the circuit input signal having the signal input level, such as the microphone signal level Vt, and produces the circuit output signal having the signal output level or the local level Vt' which is substantially equal to the signal input level when the signal input level is lower than the predetermined input level. When the signal input level is higher than the predetermined input level, the signal output level is suppressed to the predetermined output level.

While this invention has thus far been described in specific conjunction with a loudspeaker telephone device according to a preferred embodiment thereof and with a noise suppressing circuit according to an aspect thereof, it will now be readily possible for one skilled in the art to put this invention into practice in various other manners. For example, the noise suppressing circuit 25 may comprise an adjuster for adjusting the predetermined input level according, for example, to the ordinary level of the user's talk. Above all, it should clearly be understood in the manner described before with reference to FIG. 3 that the comparator unit (21–23) may produce the attenuation control signal with the attenuation control level determined in accordance with a different input level difference which is equal to the loudspeaker drive level Vr less the local level Vt'. Rather than rendered equal to each other, the signal input level and the signal output level may be rendered substantially proportional to each other by the noise suppressing circuit 25. Incidentally, the microphone output signal is supplied to the first attenuator 16 and to the first level detector 21 as a local signal of a sort in the conventional loudspeaker telephone device illustrated with reference to FIG. 1.

What is claimed is:

1. A noise suppressing circuit supplied with a circuit input signal having a signal input level for producing a circuit output signal having a signal output level, said noise suppressing circuit comprising:

a gain control unit controlled by a gain control signal having a gain control level to produce said circuit output signal by giving said circuit input signal a controllable amount of attenuation in accordance with said gain control level, said gain control level determined solely by said circuit input signal;

a rectifier unit for rectifying said circuit input signal to produce a rectified signal having a rectified voltage proportional to said signal input level;

a voltage-to-current converter unit supplied with said rectified signal to produce an output current signal having a current value proportional to a voltage increment which said rectified voltage has above a predetermined voltage, said predetermined voltage being determined to correspond with a predetermined input level; and supply means for supplying said output current signal to said gain control unit to use said current value as said gain control level whereby said signal output level is rendered proportional to said signal input level when said signal input level is lower than said predetermined input level, said signal output level being suppressed to a predetermined output level when said signal input level is higher than said predetermined input level.

2. A loudspeaker telephone device for converting a microphone output signal having a microphone signal level to a talk transmission signal and for converting a talk reception signal to a loudspeaker drive signal having a drive level, said loudspeaker telephone device including a comparator unit for comparing a local signal having a local level derived from said microphone signal level and said loudspeaker drive signal to produce an attenuation control signal in accordance with a level difference equal to said local level less said drive level, a first attenuator controlled by said attenuation control signal to produce said talk transmission signal by giving said local signal a first variable amount of attenuation decreasing with an increase in said level difference, and a second attenuator controlled by said attenuation control signal to produce said loudspeaker drive signal by giving said talk reception signal a second variable amount of attenuation increasing with said increase, said loudspeaker telephone device comprising:

a gain control unit supplied with said microphone output signal and controlled by a gain control signal having a gain control level to produce said local signal by giving said microphone output signal a controllable amount of attenuation in accordance with said gain control level, said gain control level determined solely by said microphone output signal;

a rectifier unit for rectifying said microphone output signal to produce a rectified signal having a rectified voltage proportional to said microphone signal level;

a voltage-to-current converter unit supplied with said rectified signal to produce an output current signal having a current value proportional to a voltage increment which said rectified voltage has above a predetermined voltage, said predetermined voltage being determined to correspond with a predetermined input level; and supply means for supplying said output current signal to said gain control unit to use said current value as said gain control level whereby said local level is rendered proportional to said microphone signal level when said microphone signal level is lower than said predetermined input level, said local level being suppressed to a predetermined output level when said microphone signal level is higher than said predetermined input level.

3. A loudspeaker telephone apparatus for converting a microphone output signal having a microphone signal level to a talk transmission signal and for converting a talk reception signal to a loudspeaker drive signal having a drive level, comprising:

a first level detector receiving said microphone output signal, said first level detector detecting a level of a local signal derived from said microphone signal level;

a second level detector receiving said loudspeaker drive signal, said second level detector detecting a level of said loudspeaker drive signal;

a comparator unit connected to said first and second level detectors, comparing said level of said local signal and said level of said loudspeaker drive signal and producing an attenuation control signal in accordance with a level difference equal to said local level less said drive level;

a first attenuator controlled by said attenuation control signal to produce said talk transmission signal by giving said local signal a first variable amount of attenuation decreasing with an increase in said level difference;

a second attenuator controlled by said attenuation control signal to produce said loudspeaker drive signal by giving said talk reception signal a second variable amount of attenuation increasing with said increase;

a noise suppressing circuit, receiving only said microphone output signal as a control signal input, said noise suppressing circuit generating said local signal and providing said local signal to said first attenuator and said comparator, said noise suppressing circuit including, a gain control unit supplied with said microphone output signal and controlled by a gain control signal having a gain control level to produce said local signal by giving said microphone output signal a controllable amount of attenuation in accordance with said gain control level, said gain control level determined solely by said microphone output signal, a rectifier unit for rectifying said microphone output signal to produce a rectified signal having a rectified voltage proportional to said microphone signal level, a voltage-to-current converter unit supplied with said rectified signal to produce an output current signal having a current value proportional to a voltage increment which said rectified voltage has above a predetermined voltage determined to correspond with a predetermined input level, and supply means for supplying said output current signal to said gain control unit to use said current value as said gain control level, said gain control unit rendering said local level proportional to said microphone signal level when said microphone signal level is lower than said predetermined input level, said local level being suppressed to said predetermined output level when said microphone signal level is higher than said predetermined input level.

4. A loudspeaker telephone apparatus as recited in claim 3 wherein said voltage-to-current converter unit comprises:

a voltage follower unit including an operational amplifier, receiving said rectified signal; and a current modifier unit comprising series connected diodes with a point of connection between said diodes being connected to a voltage source through a resistor.

5. A loudspeaker telephone apparatus as recited in claim 3 wherein said rectifier unit includes a half-wave detector and a smoothing unit receiving the output of said half-wave detector.

* * * * *